US006029073A

United States Patent [19]
Lebby et al.

[11] Patent Number: 6,029,073
[45] Date of Patent: Feb. 22, 2000

[54] DISPLAY CARRIER WITH BINOCULAR VIEWING FOR A PORTABLE ELECTRONIC DEVICE

[75] Inventors: Michael S. Lebby, Apache Junction; Davis H. Hartman, Chandler; Karen E. Jachimowicz, Laveen, all of Ariz.

[73] Assignee: Motorola, Inc, Schaumburg, Ill.

[21] Appl. No.: 09/028,035

[22] Filed: Feb. 24, 1998

[51] Int. Cl.[7] .................................................. H04B 17/00
[52] U.S. Cl. ........................ 455/566; 348/333; 348/373; 455/349; 345/3
[58] Field of Search ............................... 455/566, 349; 379/433; 396/374; 348/333, 373, 374, 375, 376, 372; 345/1, 2, 3

[56] References Cited

U.S. PATENT DOCUMENTS 4,856,088  8/1989  Oliwa et al. ............................ 455/349
5,729,289  3/1998  Etoh ....................................... 348/333

*Primary Examiner*—Richard A. Hjerpe
*Assistant Examiner*—Marthe Y Marc-Coleman
*Attorney, Agent, or Firm*—Eugene A. Parsons

[57] ABSTRACT

A portable electronic device including a display carrier detachably mounted to the portable electronic device. The display carrier including a virtual image display apparatus. A data communication interface is provided between the display carrier and the portable electronic device for permitting data exchange between the display apparatus and the portable electronic device. The display apparatus including a binocular optical system for providing an image output at a right eye output and a left eye output.

20 Claims, 2 Drawing Sheets

DISPLAY CARRIER WITH BINOCULAR VIEWING FOR A PORTABLE ELECTRONIC DEVICE

FIELD OF THE INVENTION

The present invention pertains to the addition of a virtual display in association with a portable electronic device. More particularly, this invention pertains to a display carrier with binocular viewing of a virtual display utilized in conjunction with a portable electronic device.

BACKGROUND OF THE INVENTION

Portable electronics equipment, such as radios, cellular and cordless telephones, pagers and the like, are becoming increasingly popular. In many instances it is desirable to provide apparatus on the equipment to supply the operator with visual messages that include graphics and printed information as well as a means to access and manipulate such messages. The problem is that prior art apparatus providing these functions require relatively high electrical power and require a great amount of area to be sufficiently large to produce useful and visually perceivable information.

In the prior art, for example, it is common to provide visual apparatus utilizing liquid crystals, directly viewed light emitting diodes, etc. These produce very large and cumbersome displays that greatly increase the size of the receiver and require relatively large amounts of power.

Apparatus incorporating a miniature virtual image, which solves most of the problems mentioned above, is disclosed, for example, in U.S. Pat. No. 5,224,198, entitled "WAVEGUIDE VIRTUAL IMAGE DISPLAY", issued Jun. 29, 1993. Typically, the products in which the miniature virtual image display is incorporated are small handheld devices.

Typically, in portable electronics equipment, such as radios, cellular and cordless telephones, pagers and the like, there exists a small display which illustrates the number being dialed or the function being programmed. Greater capabilities in terms of displayed information can be achieved by adding an additional display or displays to the portable electronics equipment. Of concern is the positioning of these additional displays, the means for viewing the additional display, and the associated display electronics.

Therefore, there exists a need to provide for a display carrier that has housed therein a virtual image display. The virtual image display is capable of binocular viewing. The detachable display carrier is fabricated to detachably mount to a portable electronic device.

Accordingly, it is a purpose of the present invention to provide for a display carrier including a virtual image display housed in the display carrier, the display carrier utilized in conjunction with an existing portable electronic device.

It is also a purpose of the present invention to provide for binocular viewing of the virtual image display utilized in conjunction with an existing portable electronic device.

It is a further purpose of the present invention to provide for a new and improved display carrier including a virtual image display with binocular viewing, which enables the virtual image display and thus data contained within the portable electronic device to be accessed and thus viewable by the user with increased visual imaging for the user.

It is a still further purpose of the present invention to provide for a new and improved display carrier including a virtual image display, which has provided moveable or changeable optics to provide for an interchangeable direct view display.

SUMMARY OF THE INVENTION

The above problems and others are at least partially solved and the above purposes and others are realized in a portable electronic device including a display carrier having housed therein a virtual image display apparatus and associated binocular optics. The display carrier is operational to provide for binocular viewing of a generated image.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DESCRIPTION OF THE PREFERRED EMBODIMENTS

Figure 1:
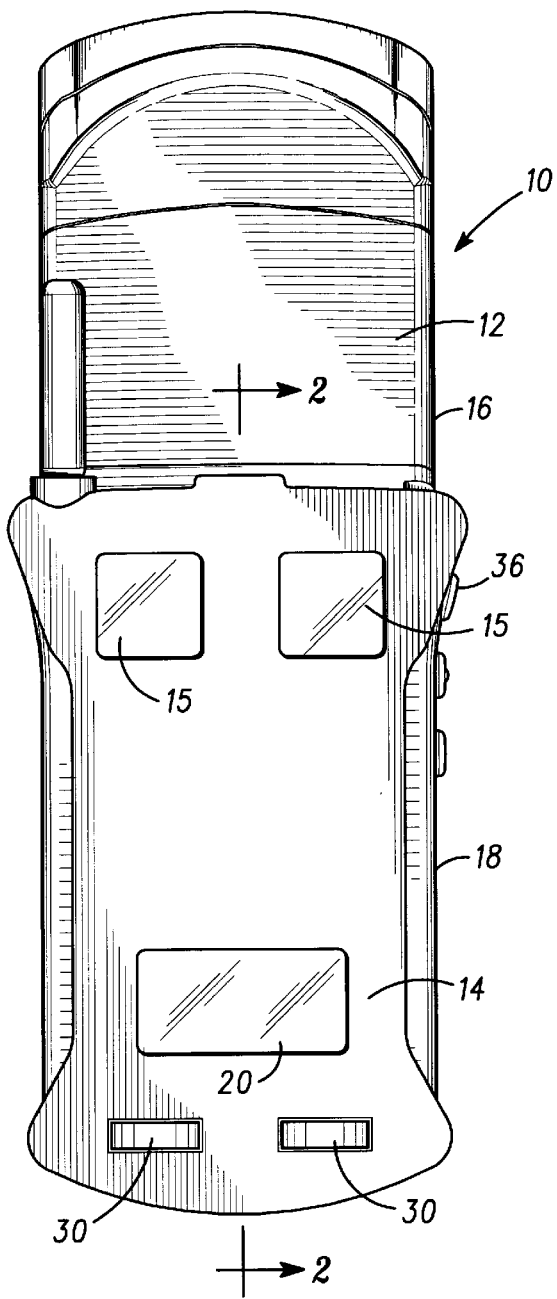
FIG. 1 is a simplified schematic view of a portable electronic device with a detachable display carrier according to the present invention.

Referring specifically to FIG. 1, illustrated in simplified schematic view is a portable electronic device 10 with a power source 12, more particularly a battery, and further illustrating the attachment of a display carrier 14 detachably positioned on portable electronic device 10. In this particular embodiment, portable electronic device 10 is generally illustrated as a portable communications device, such as a cellular telephone, but may include any type of portable electronics equipment, handheld electronic device, or portable/handheld communication receiver, including a pager, two-way radio, or a transceiving device such as a portable telephone, or the like. Portable electronic device 10 is fabricated having hinged first major portion 16 and second major portion 18. First major portion 16 and second major portion 18 are hingeably attached so as to allow for the positioning of first major portion 16 and second major portion 18 on top of each other when portable electronic device 10 is in a closed or non-operational position. Display carrier 14 includes in this particular embodiment a virtual image display apparatus (discussed presently) for viewing a displayed image or images through a binocular viewing aperture 15. In this particular embodiment, display carrier 14 additionally includes a direct view display 20. It should be understood that any combination of displays, both virtual and direct view are anticipated by this disclosure, dependent upon the specific application for display carrier 14, more particularly portable electronic device 10.

As illustrated in FIG. 1, there is positioned on a rear side of first major portion 16 of portable electronic device 10, battery 12 in electrical interface with portable electronic device 10. Battery 12 provides power to portable electronic device 10 during portable usage. It should additionally be understood that there is provided on portable electronic device 10 a receptacle (not shown) for operation of portable electronic device 10 with a hardwired power source such as an AC/DC power source.

Figure 2:
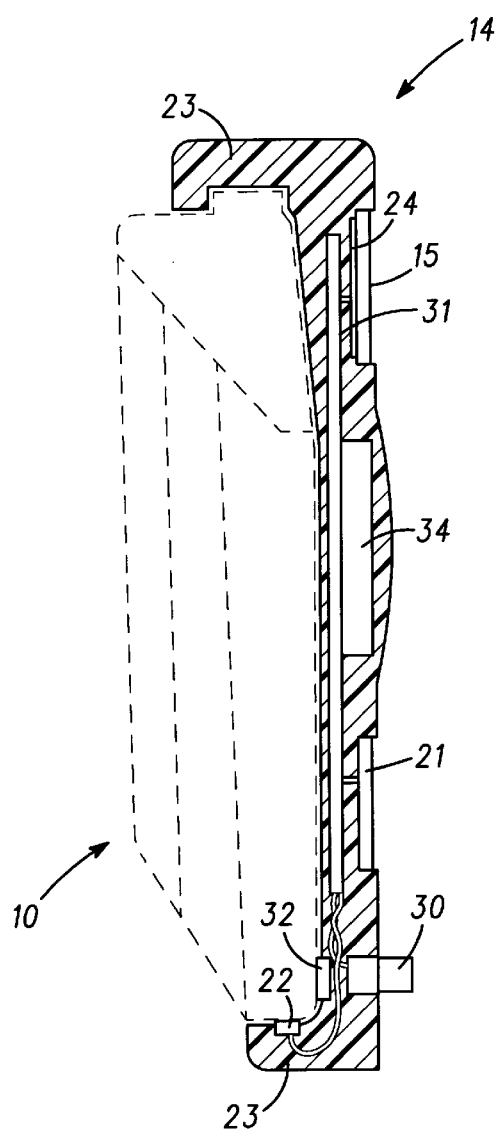
FIG. 2 is a simplified schematic cross-sectional view taken through line 2—2 of FIG. 1 illustrating the display carrier and virtual image display of the present invention.

Display carrier 14 is detachably mounted to portable electronic device 10 utilizing snap-fit connections 23 (as also illustrated in FIG. 2) and having electronic interface with portable electronic device 10 through the standard provided phone connection plate 22 on the base of second major portion 18 (as illustrated in FIG. 2). There is provided a wireless communication port 32 such as for use with infra red signals, radio frequency signals, or the like. Wireless communication port 32 (as illustrated in FIG. 2) is included to serve as a means for communication of data signals, more specifically, a data communication interface, between display carrier 14 and portable electronic device 10. More particularly, it is anticipated by this disclosure to include a data communication interface between display carrier 14 in the form of an electrical connector interface 22, such as a standard electrical connector or solid form factor design, or a wireless link, such as an infra-red optical link or infrared link. In the instance when an infra-red optical link is provided, a vertical cavity surface emitting laser (VCSEL) based free-space interconnect between the control electronics (discussed presently) of the device and the display carrier 14 is anticipated. The use of a semiconductor based optical link allows for data transmission rates on the order of 1Gbps to be achieved which helps the display electronics read and image the data easier and faster.

Referring now to FIG. 2, illustrated is display carrier 14 positioned on portable electronic device 10. Display carrier 14 is generally formed to include a virtual image display apparatus 24, characterized as displaying informative data, such as a complete frame of alphagraphics, contained within portable electronic device 10 and a direct view display apparatus 21. Further information on virtual image displays, such as that utilized for display 24 can be found in U.S. Pat. No. 5,224,198, entitled "WAVEGUIDE VIRTUAL IMAGE DISPLAY", issued Jun. 29, 1993, assigned to the same assignee and incorporated herein by this reference. In this particular embodiment, virtual image display 24 has provided dual modes of magnification provided by various binocular optical systems (discussed presently) . Direct view display 20 is a non-emissive liquid crystal display (LCD) or alternatively an emissive display such as one utilizing organic electroluminescent technology.

Display carrier 14 further includes a plurality of user and control function buttons 30 (as illustrated in FIGS. 1 and 2) which upon activation correlate to responsive cursor movement and/or control display operations in displays 21 and 24 of display carrier 14. It should be understood that display carrier 14 in this particular embodiment is formed so as to be detachable from portable electronic device 10, for use separate and apart from portable electronic device 10. As previously stated, display carrier 14 includes a wireless connection so as to be in data communication interface with portable electronic device 10. In this particular embodiment, display carrier 14 is in wireless communication with portable electronic device 10 by way of infra red connection port 32 thus signals between display carrier 14 and portable electronic device 10 are wirelessly communicated to display carrier 14 and ultimately to displays 21 and 24 through an internal data bus 31 which carries data, interfaced with displays 21 and 24. As illustrated display carrier 14 additionally includes a power source 34, such as a lithium ion battery, for supplying backup power to battery 12, thus portable electronic device 10, when necessary or power to display carrier 14 when utilized separate and apart from portable communication device 10 utilizing wireless communication interface 32.

During operation, a user of portable electronic device 10 having positioned on a rear surface of second major portion 18 display carrier 14, is able to control displays 21 and 24 through function control buttons 30. It should be understood that while a specific type and orientation of function control buttons 30 is illustrated, that any variety of controlling buttons, etc. can be used such as a trackball, a slide bar, touch buttons, or the like. Each individual button 30 is interfaced with cursor electronics (not shown) for controlling displays 21 and 24, with each button 30 typically characterized as serving as a separately programmed function button.

Portable electronic device 10 is designed to be held by an operator with one hand. Electronics (discussed presently) are mounted in the detachable display carrier 14 and connected to the cursor electronics (not shown) for producing functionally responsive displays 21 and 24. An ON/OFF or power switch 36 (see FIG. 1) is located on equipment 10, thereby allowing the user to power "ON" or turn "OFF" the equipment as necessary. Other means of activating and deactivating power to portable electronic device 10, thus display apparatus 21 and 24, are anticipated by this disclosure. Once power to portable electronic device 10 is activated, displays 21 and 24 would become operational through buttons 30, which is translated into control of displays 21 and 24.

Figure 3:
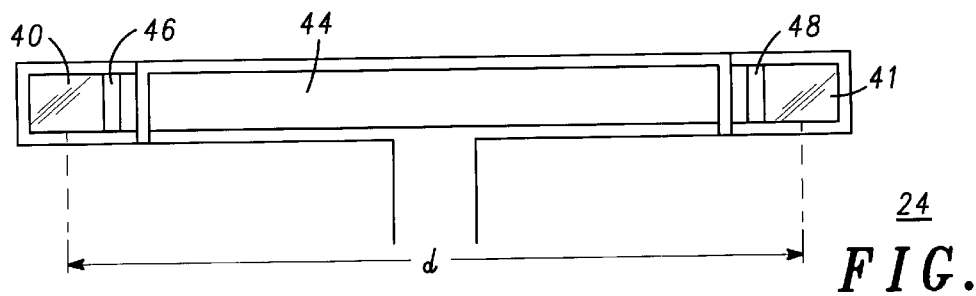
FIG. 3 is a simplified schematic view of the display apparatus mounted to a tab tape of the present invention.

Referring specifically to FIG. 3, illustrated is a schematic diagram of display apparatus 24 according to the present invention. In this particular embodiment, display apparatus 24 is composed of virtual display devices 40 and 41. Display devices 40 and 41 are connected using flexible tab tape 44, which acts as a bus for data signals. Display devices are separated for binocular viewing by approximately 50 mm as noted by distance "d". In addition included are display drivers 46 and 48 for driving display devices 40 and 41. Data bus, more particularly tab tape 44, is connected to an internal phase bus (not shown) for control circuitry. In addition, tab tape 44 is connected to direct view display 20 (FIG. 1) in this particular embodiment.

Figure 4:
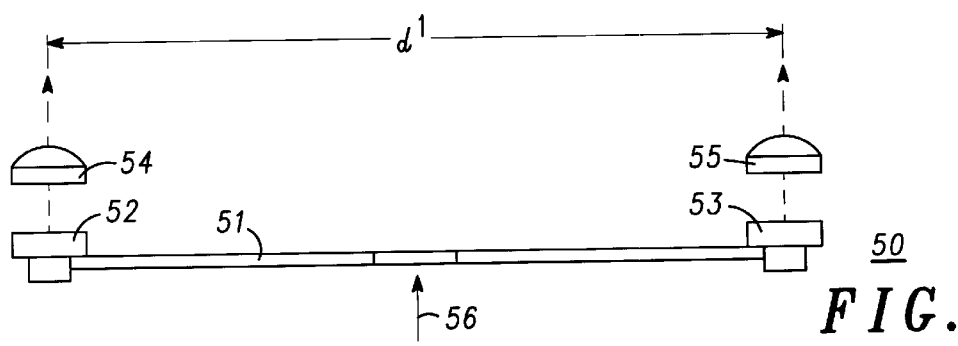
FIGS. 4, 5 and 6 are various optical systems utilized in conjunction with the display apparatus housed in the display carrier according to the present invention.
Figure 5:
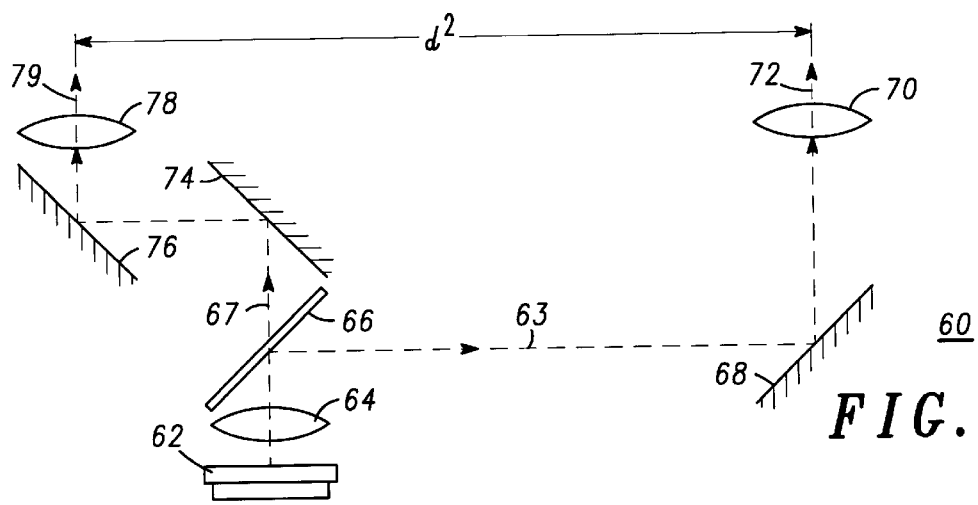
Figure 6:
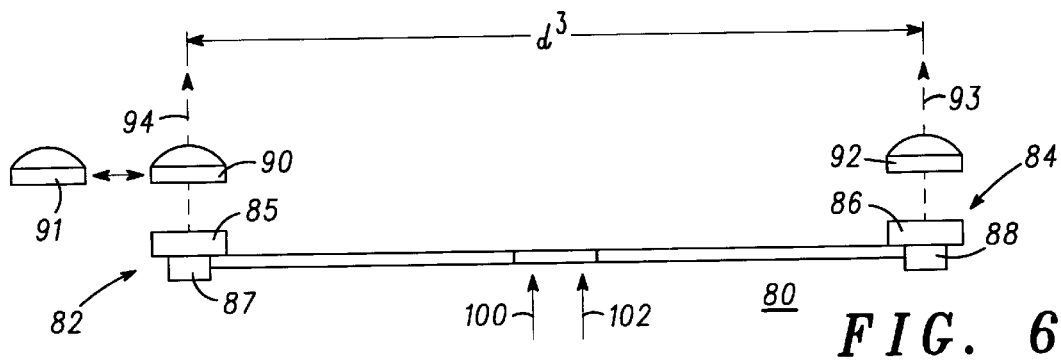

Referring now to FIGS. 4, 5 and 6, illustrated in simplified schematic views are a plurality of binocular optical systems which can be utilized in virtual display apparatus 24 of the present invention. It should be understood that virtual display 24 can have a multiple magnification levels. Typically, magnification levels of ×5 and ×15 are included as the preferred embodiments. The preferred range for a zoom control would be ×2–×10 or ×4–×20. Otherwise preset magnification levels would be used, e.g. setting of ×5, ×10 or ×20.

Illustrated in FIG. 4 is a first binocular optical system 50, including two discrete optical systems, which may be included as a part of display apparatus 24. Optical system 50 includes dual image sources 52 and 53, mounted to a tab tape 51. Image sources 52 and 53 are mounted a distance "$d^1$" of approximately 50 mm or less to achieve binocular viewing. Lens systems 54 and 55 are included for magnification of the image received from image sources 52 and 53. During operation one video signal is received at an input 56 and submitted to both image sources 52 and 53. This type of system, with the submission of one video signal creates a binocular, non-stereoscopic system.

Illustrated in FIG. 5 is a second binocular optical system 60, which may be included as a part of display apparatus 24.

Optical system 60 includes one image source 62. During operation the image generated by image source 62 passes through a first optical element 62. A fifty percent (50%) beamsplitter 66 is positioned in a path of the generated image, therefore splitting the image into a dual optical path. A first portion 63 of the generated image is split and ultimately reflected off the surface of a 100% reflective mirror 68 and ultimately passes through an optical element 70 and is output as a right eye output 72. A second portion 67 of the generated image passes through beamsplitter 66 and is reflected off the surfaces of 100% reflective mirrors 74 and 76 prior to passing through an optical element 78 and is output as a left eye output 79. This type of dual optical path system creates a binocular, non-stereoscopic system. Again, a separation distance "$d^2$" is approximated at 50 mm or less between right eye output 72 and left eye output 79 to create binocular viewing.

Illustrated in FIG. 6 is a third binocular optical system 80 which is generally composed of two image sources 82 and 84 and two discrete optical systems. Image sources 82 and 84 are typically formed of a liquid crystal display 85 and 86 and backlights 87 and 88. The optical systems are composed of optical elements 90 and 92 with a right eye output 93 and a left eye output 94. During operation two discrete video signals 100 and 102 are received at an input. This system utilizes the two video signals 100 and 102 to create left/right eye pair video images, thereby creating a binocular, stereoscopic three-dimensional (3D) system. As illustrated, left eye optical system includes a second optical element 91 so as to allow for different magnification levels to be used. In this embodiment, the left eye optical system would be switched into a low magnification mode with moveable or changeable optical element 91. When lens 91 is utilized instead of lens 90, a low magnification mode would allow for the viewing of a direct view type image. This low magnification image can be viewed from 10–15 inches away. When optical elements 90 and 92 are used, a binocular viewing, high magnification mode would allow for the viewing of a virtual image.

Accordingly, a new and improved detachable display carrier with binocular viewing for use with a portable electronic device, such as a portable communications device, is disclosed. The new and improved detachable display carrier is designed for use in small handheld electronic devices and is situated so as to allow the user to view a virtual display utilizing binocular viewing generated by a binocular optical system. Thus, a display carrier, housing dual display apparatus is disclosed which is small and easy to operate so that it can be detachably incorporated into very small electronic equipment, such as radios, cellular and cordless telephones, pagers, data banks and the like.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A portable electronic device with removable display carrier comprising:
    a display carrier detachably mounted to a portable electronic device having a power source, the display carrier including a virtual image display apparatus;
    a binocular optical system included in the virtual image display apparatus; and
    a data communication interface between the display carrier and the portable electronic device.

2. A portable electronic device with removable display carrier as claimed in claim 1 wherein the display carrier further includes a direct view display apparatus.

3. A portable electronic device with removable display carrier as claimed in claim 2 wherein the power source is interchangeable between a portable battery power source and a hardwired power source.

4. A portable electronic device with removable display carrier as claimed in claim 1 wherein the data communication interface is a wireless connection.

5. A portable electronic device with removable display carrier as claimed in claim 1 wherein the data communication interface is an electrical connector interface.

6. A portable electronic device with removable display carrier as claimed in claim 1 wherein the binocular optical system includes one image source and a dual optical path.

7. A portable electronic device with removable display carrier as claimed in claim 1 wherein the binocular optical system includes two image sources, one video signal and two discrete optical systems.

8. A portable electronic device with removable display carrier as claimed in claim 1 wherein the binocular optical system includes two image sources, two video signals and two discrete optical systems.

9. A portable electronic device with removable display carrier comprising:
    a handheld electronic device;
    a power source interfaced with the handheld electronic device;
    a detachable display carrier mounted on the handheld electronic device and including a virtual image display apparatus for viewing of displayed images by an operator, the virtual image display apparatus including display electronics;
    a binocular optical system including at least one image source included in the virtual image display apparatus; and
    a data communication interface between the display carrier and the portable electronic device.

10. A portable electronic device with removable display carrier as claimed in claim 9 wherein the power source is interchangeable between a portable battery power source and a hardwired power source.

11. A portable electronic device with removable display carrier as claimed in claim 9 wherein the virtual image display apparatus provides for a virtual image of a complete frame of alphagraphics in the virtual image display apparatus.

12. A portable electronic device with removable display carrier as claimed in claim 9 wherein the data communication interface includes a wireless connection.

13. A portable electronic device with removable display carrier as claimed in claim 9 wherein the data communication interface includes an electrical connector interface.

14. A portable electronic device with removable display carrier as claimed in claim 9 wherein the binocular optical system includes binocular viewing apertures.

15. A portable electronic device with removable display carrier as claimed in claim 14 wherein the binocular optical system further includes two discrete optical systems and one video input signal.

16. A portable electronic device with removable display carrier as claimed in claim 14 wherein the binocular optical system further includes two discrete optical systems and two video input signals.

17. A portable electronic device with removable display carrier as claimed in claim 16 wherein the two discrete optical systems allow for operation in a low magnification mode thereby providing a direct view image and operation in a high magnification mode thereby providing a virtual image.

18. A portable electronic device with removable display carrier comprising:

a handheld communication receiver;

a power source interfaced with the handheld communication receiver for supplying power thereto the handheld communication receiver;

a display carrier, including a virtual image display apparatus, electrically connected to and detachably mounted on the portable electronic device, the virtual image display apparatus having a binocular viewing aperture;

a binocular optical system including at least one image source and a plurality of optical elements included in the virtual image display apparatus; and a data communication interface between the display carrier and the handheld communication receiver for data transmission between the handheld communication receiver and the virtual image display apparatus of the display carrier.

19. A portable electronic device with removable display carrier as claimed in claim 18 wherein the display carrier further includes a direct view image display apparatus.

20. A portable electronic device with removable display as claimed in claim 18 wherein the binocular optical system further includes at least one image source characterized as generating an image for output at a left eye output and a right eye output.

* * * * *